United States Patent
Montero et al.

(10) Patent No.: US 9,635,174 B1
(45) Date of Patent: Apr. 25, 2017

(54) VIDEO RELAY SERVICE, COMMUNICATION SYSTEM, AND RELATED METHODS FOR CONNECTING USERS WITH N11 SERVICES IN A VIDEO RELAY SERVICE ENVIRONMENT

(71) Applicant: Sorenson Communications, Inc., Salt Lake City, UT (US)

(72) Inventors: Adam Montero, Midvale, UT (US); Janet Lynn Esposito, Layton, UT (US); Scot L. Brooksby, Highland, UT (US); Grant A. Beckmann, Orem, UT (US)

(73) Assignee: SORENSON IP HOLDINGS, LLC, Salt Lake City, UT (US)

( * ) Notice: Subject to any disclaimer, the term of this patent is extended or adjusted under 35 U.S.C. 154(b) by 0 days.

(21) Appl. No.: 15/203,705

(22) Filed: Jul. 6, 2016

(51) Int. Cl.
*H04M 11/00* (2006.01)
*H04M 3/42* (2006.01)
*H04N 7/14* (2006.01)

(52) U.S. Cl.
CPC ........ *H04M 3/42391* (2013.01); *H04N 7/141* (2013.01)

(58) Field of Classification Search
None
See application file for complete search history.

(56) References Cited

U.S. PATENT DOCUMENTS

| | | |
|---|---|---|
| 5,559,856 A | 9/1996 | Dowens |
| 6,697,475 B1 | 2/2004 | MeLampy et al. |
| 6,735,285 B2 | 5/2004 | Orwick et al. |
| 7,746,985 B2 | 6/2010 | Armstrong et al. |
| 7,809,121 B2 | 10/2010 | Gruchala et al. |
| 8,189,568 B2 | 5/2012 | Qiu et al. |
| 8,498,222 B2 | 7/2013 | Brooks et al. |
| 8,610,755 B2 | 12/2013 | Brooksby et al. |

(Continued)

OTHER PUBLICATIONS

Winsor, et al; U.S. Appl. No. 14/741,296; "High-Speed Video Interfaces, Video Endpoints, and Related Methods"; filed Jun. 16, 2015.

(Continued)

*Primary Examiner* — Creighton Smith
(74) *Attorney, Agent, or Firm* — TraskBritt (57) ABSTRACT

Video relay services, communication systems, and methods are disclosed connecting users with N11 services in a video relay service environment. A video relay service may comprise at least one server configured to manage a customer database including customer records for audibly-impaired users of the video relay service, manage an N11 database including alternate numbers corresponding to N11 codes for a plurality of different locations defined by political boundaries, receive incoming video calls including an N11 code from a calling party, resolve the N11 code to an appropriate alternate number for an N11 service based on a political boundary for the calling party responsive to a query of the N11 database, establish a first connection between a video communication device associated with the calling party and a call assistant station associated with a sign language interpreter, and establish a second connection between the call assistant station and the N11 service.

20 Claims, 8 Drawing Sheets

(56) References Cited

U.S. PATENT DOCUMENTS

| | | | |
|---|---|---|---|
| 8,976,220 B2 | 3/2015 | Maxwell | |
| 9,217,911 B1 | 12/2015 | Winsor et al. | |
| 2005/0213716 A1 | 9/2005 | Zhu et al. | |
| 2006/0285652 A1* | 12/2006 | McClelland | H04M 3/42391 379/52 |
| 2009/0005068 A1* | 1/2009 | Forstall | H04M 3/42365 455/456.1 |
| 2009/0310602 A1 | 12/2009 | Olshansky et al. | |
| 2012/0269331 A1 | 10/2012 | Harris et al. | |

OTHER PUBLICATIONS

United Way Airs 2-1-1 "Get Connected Get Answers"; Website: http://211us.org/ [May 18, 2016 7:03:46 PM]; 2 pages.

211 Org; "Help Starts Here, Find Your Local 2-1-1"; web access at: http://www.211.org/ [May 18, 2016 6:42:33 PM]; 2005-2016 United Way Worldwide, 5 pages.

E9-1-1 FAQs; web site: https://www.west.com/safety-services/enterprise/e9-1-1-faqs/ [May 18, 2016 7:06:56 PM]; West Corporation; 6 pages.

E911 Basics; "What is E911"; web site: http://www.redskye911.com/about-e911 [May 18, 2016 6:39:05 PM]; RedSky Technologies; 3 pages.

E911 Solutions; "911 Emergency Telecom"; website: http://www.911etc.com/solutions [May 18, 2016 6:41:24 PM]; 2 pages.

Federal Communications Commission Fact Sheet; "Abbreviated Dialing Codes—N11" Jul. 2000; 2 pages.

U.S. Department of Transportation Federal Highway Administration; 511: America's Traveler Information Telephone Number; Web site: http://www.fhwa.dot.gov/trafficinfo/511what.htm [May 18, 2016 7:04:37 PM], last modified Oct. 19, 2015; 1 page.

VoIP and 911 Service; "Welcome to the new FCC.gov," Federal Communications Commission; Website: https://www.fcc.gov/consumers/guides/voip-and-911-service[May 18, 2016 6:36:36 PM]; 6 pages.

* cited by examiner

VIDEO RELAY SERVICE, COMMUNICATION SYSTEM, AND RELATED METHODS FOR CONNECTING USERS WITH N11 SERVICES IN A VIDEO RELAY SERVICE ENVIRONMENT

TECHNICAL FIELD

The disclosure relates to telecommunication systems generally, including video relay services that provide sign language interpretive services for audibly-impaired users. More specifically, the disclosure relates to connecting users with appropriate N11 services within the video relay service environment.

BACKGROUND

Traditional communication systems, such as standard and cellular telephone systems, enable verbal communications between people at different locations. Communication systems for hard-of-hearing individuals may also enable non-verbal communications instead of, or in addition to, verbal communications. Some communication systems for hard-of-hearing people enable communications between communication devices for hard-of-hearing people and communication systems for hearing users (e.g., standard telephones, cellular telephones, etc.) For example, a video relay service (VRS) may provide speech to sign language translation services, and sign language to speech translation services for a communication session between a video phone for a first user and a traditional telephone for a hearing user. Conventionally, the audibly-impaired user communicates with a call assistant (e.g., communicating via sign language), and then the call assistant conveys the messages to the far-end user.

An N11 code is a 3 digit number that is set aside by the North American Numbering Plan (NANP) for specified types of services. Callers may dial an N11 code (e.g., 211, 311, etc.) as an abbreviated dialing phone number that allows access to these specified services. For users of a video relay service, unique problems may occur because calls may be routed through the VRS provider to a sign language interpreter to assist with the call. The sign language interpreter may be located at a remote location (e.g., a call center) that is different than the caller attempting to access the N11 services. As a result, if the VRS service were to dial the N11 code for the caller, the specific N11 services corresponding to the location of the sign language interpreter would be called as opposed to the N11 services corresponding to the location of the caller. As a result, VRS providers have not offered most N11 services other than 911 emergency calls to an outside contractor to establish the emergency call. Other N11 services remain unsupported within the VRS environment, leaving the community underserved relative to those who are in the hearing environment.

BRIEF SUMMARY

In some embodiments, the disclosure includes a video relay service comprising at least one server. The at least one server is configured to manage a customer database including customer records for audibly-impaired users of the video relay service, manage an N11 database including alternate numbers corresponding to N11 codes for a plurality of different locations defined by political boundaries, receive incoming video calls including an N11 code from a calling party, resolve the N11 code to an appropriate alternate number for an N11 service based on a political boundary for the calling party responsive to a query of the N11 database, establish a first connection between a video communication device associated with the calling party and a call assistant station associated with a sign language interpreter, and establish a second connection between the call assistant station and the N11 service. The N11 code is selected from the group consisting of 211, 311, 511, 711, and 811.

In some embodiments, the disclosure includes a method of routing an N11 call received at a video relay service configured to provide sign language interpretive services during the N11 call. The method comprises receiving a call including an N11 code at a video relay service from a video communication device associated with a registered customer of the video relay service, establishing a first connection between the video relay service and the video communication device, resolving the N11 code to an alternate number corresponding to an appropriate N11 service based, at least in part, on the N11 code and a determination of at least one political boundary associated with a location of the video communication device, and establishing a second connection between the video relay service and the appropriate N11 service responsive to resolving the N11 code to the alternate number such that a call assistant at the video relay service is connected to both the video communication device via the first connection and the N11 service via the second connection. The N11 code is selected from the group consisting of 211, 311, 511, 711, and 811.

In some embodiments, the disclosure includes a video communication system. The video communication system comprises a video communication device and a video relay service. The video communication device includes a camera and a display screen configured for an audibly-impaired user to engage in a communication session with a far-end user. The video relay service is configured to receive an N11 call from the video communication device responsive to an N11 code being dialed, wherein the N11 code is selected from the group consisting of 211, 311, 511, 711, and 811, establish a first connection with the video communication device, and establish a second connection with an N11 service corresponding to the N11 code and an appropriate alternate number resolved from the N11 code based on at least one political boundary designated for the video communication device.

DETAILED DESCRIPTION

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video relay service for providing sign language interpretation services to assist audibly-impaired users. Embodiments include features that improve the functionality of the communication device such that a new communication device and method for controlling a video communication device is provided. As a result, the interaction of the communication device with other systems may be improved in addition to an improved user experience.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "connect," "connecting," "connection," and other derivations of "connect" refer to communicating or establishing a communication session between two or more elements. These terms do not necessarily mean that there is a physical connection between the elements. The "connection" may be through an appropriate wireless communication network as well as a wired communication network. It should be understood that the phrase "connecting a user" (or variations thereof) is a shorthand way to describe connecting the device associated with the user with another device associated with another user.

An "audibly-impaired" user may have a condition that may make it difficult to communicate with an audibly-capable user. The audibly-impaired user may exhibit varying levels of impairment and may be a voice-capable audibly-impaired user or a voice-incapable audibly-impaired user. The audibly-impaired user may be a hearing-impaired (e.g., deaf, hard-of-hearing, etc.) user, a speech-impaired (e.g., mute) user, or have some other impairment or combination thereof.

Embodiments of the disclosure include apparatuses and methods for operating a communication system. It should be noted that while the utility and application of the various embodiments of the disclosure are described herein with reference to a relay service for individuals having disabilities, the embodiments of the disclosure also include any environment for a communication system to receive N11 calls originating from various different remote locations and establishing a connection to the appropriate N11 service corresponding to the location of the caller.

Figure 1:
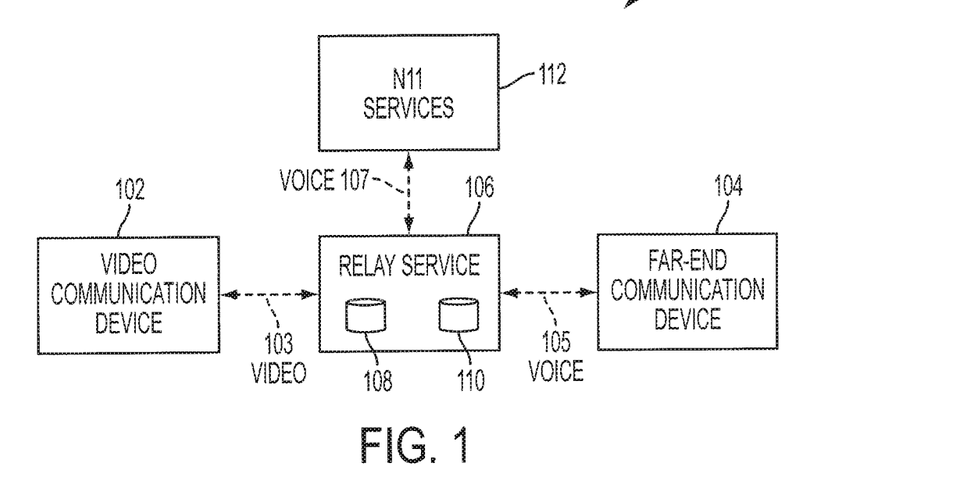
FIG. 1 is a simplified block diagram of a communication system according to an embodiment of the disclosure.

FIG. 1 is a simplified block diagram of a communication system 100 according to an embodiment of the disclosure. The communication system 100 may include a video relay service (VRS) configured to facilitate communication between audibly-impaired users and far-end users (e.g., audibly-capable users, computerized systems, etc.). The depicted communication system 100 includes a video communication device 102 and a far-end communication device 104 that are configured to participate in communication sessions via a relay service 106 through one or more networks.

In some embodiments, the video communication device 102 may comprise a communication device specifically configured for use by an audibly-impaired user. Communication devices that may be used to assist users having such an impairment may include a video phone device, a text-captioned device, a keyboard, a remote control, other devices or accessibility interfaces, and combinations thereof. The video communication device 102 may include a computing device configured to execute software directed to perform such communication capabilities. In such an embodiment, the computing device may be modified with software to operate as a video communication device. Examples of suitable computing devices may include a desktop computer, a laptop computer, a tablet computer, a personal digital assistant (PDA), a smartphone, a set top box coupled with a monitor (e.g., television) and camera (e.g., webcam), and other computing devices.

In a typical relay system environment, the video communication device 102 may be operated by a user having an audible impairment, and the far-end communication device 104 may be operated by an audibly-capable user. For convenience, the video communication device 102 may also be referred to as the "near-end" device, while the far-end communication device 104 may also be referred to herein as the "far-end" device. The user of the video communication device 102 may be referred to as the "near-end user," and the user of the far-end communication device 104 may be referred to as the "far-end user." Of course, it is recognized that "near-end" and "far-end" are relative terms depending on the perspective of the particular user. Thus, the terms "near-end" and "far-end" are used as a convenient way of distinguishing between users. Communication devices may also be referred to as "endpoints."

The relay service 106 is configured to interpret communication between the video communication device 102 and the far-end communication device 104 to facilitate assisted communication sessions therebetween. The operator at the relay service 106 performing the interpretation may be referred to as a "call assistant" or "interpreter." Communication between the video communication device 102 and the relay service 106 may be typically performed through video communication between the near-end user and the call assistant, while communication between the relay service 106 and the far-end communication device 104 may be typically performed using voice communication between the call assistant and the far-end user. Thus, the video data 103 (and optionally voice data) may be communicated between the video communication device 102 and the relay service 106. Voice data 105 (and optionally video data) may be communicated between the relay service 106 and the far-end communication device 104. The video data 103 may include video information conveying video images of the near-end user and the call assistant. For example, the video data 103 sent from the video communication device 102 to the relay service 106 may include video images of the near-end user that are displayed by an electronic display at the relay service 106 to the call assistant. The video data 103 sent from the relay service 106 to the video communication device 102 may include video images of the call assistant that are displayed by an electronic display at the video communication device 102 to the near-end user. As a result, the near-end user and the call assistant may communicate with each other using visual cues (e.g., sign language, facial expressions, lip reading, and/or other body language) between the near-end user and the call assistant.

If the near-end user has at least some speech capabilities (e.g., users that are audibly-impaired, but have some ability to speak), voice data may be transmitted from the video communication device 102 to the relay service 106. If the near-end user has at least some audible-capabilities (e.g., users that are not completely deaf), voice data may be transmitted in addition to the video data 103 from the relay service 106 to the video communication device 102. In some embodiments, however, audio from the video communication device 102 may be disabled such that the relay service 106 and/or the far-end communication device 104 may not be able to hear any speech or other audible noise from the video communication device 102.

The relay service 106 and the far-end communication device 104 may be configured to communicate voice data 105 with each other to facilitate hearing communication between the call assistant and the far-end user (e.g., a live person, a computer system, etc.) The voice data 105 may include audible information shared between the relay service 106 and the far-end communication device 104. For example, the voice data 105 may include audible speech of the call assistant and the far-end user. As a result, the communication system 100 may facilitate translated communication for near-end users with others regardless of whether the far-end user is able to communicate using the mode of communication for the near-end user. In some embodiments, the voice data 105 transmitted to the far-end communication device 104 may also include audible speech of the near-end user if the video communication device 102 is configured to transmit audio, and such audio is desired to be heard by the far-end user. Voice data 105 generated by the far-end user is not limited to live voice from a live person. For example, the far-end user may include an automated telephone menu system that transmits voice data 105 that includes synthesized voice, recorded voice, or other audible information intended to convey information (e.g., interactive voice response (IVR)).

In some embodiments, the far-end communication device 104 may be configured to also send and receive video communications. For example, both the video communication device 102 and the far-end communication device 104 may be video phones of the VRS communication system 100. In such embodiments, the far-end communication device 104 may be configured to receive the video data including the video images of the near-end user, the call assistant, or a combination thereof. The far-end communication device 104 may be configured to receive the video data from the video communication device 102, the relay service 106, or combinations thereof. Receipt of the video data by the far-end communication device 104 may enable the far-end user to observe non-verbal communication from the near-end user. Thus, the communication system 100 may also be configured to facilitate communication between audibly-impaired users as well.

The relay service 106 may also be configured to facilitate communication between the video communication device 102 and various N11 services 112 over a defined region. An N11 code is an abbreviated dialing phone number that allows access to specific services for a defined region (e.g., city, state, county, etc.). Each N11 code has a different assigned use. Typical N11 code assignments for corresponding N11 services are summarized as follows in Table 1:

TABLE 1

| N11 | CODES |
| --- | --- |
| 211 | Community Information and Referral Services |
| 311 | Municipal Government Services and Non-Emergency Public Services |
| 411 | Directory Assistance Service |
| 511 | Traffic and Other Transportation Information Services |
| 611 | Telephone Service Provider Services (e.g., Customer Service) |
| 711 | TDD and Relay Services for Deaf and Hard of Hearing Users |
| 811 | Underground Public Utility Location Services |
| 911 | Emergency Services (e.g., Police, Fire, Ambulance, etc.) |

Typically, each N11 service has an alternate number using the typical phone numbering format, such as the 10 digit number in the United States. As a result, the user could reach the desired N11 service in his region by dialing the N11 code (e.g., 211) or by dialing the corresponding alternate number directly (e.g., (555) 555-1234). Each N11 code also has a variety of different alternate numbers depending on the location of the user (e.g., according to city, county, and/or state), wherein the location may be defined by political boundaries (e.g., city, state, county, etc.). In other words, a first user in a first location (e.g., Idaho) that initiates a call by dialing an N11 code should be connected to a different N11 service than a second user in a second location (e.g., Connecticut) that initiates a call by dialing the same N11 code. This presents a particular challenge for the VRS environment in that the call assistant is typically located in a VRS call center at an unrelated location, and the appropriate N11 service should be connected for the calling party rather than according to the call assistant providing the sign language assistance for the call. Thus, the relay service 106 may be configured to receive the N11 code from a first user in a first location and resolve the N11 code to the appropriate alternate number to connect the first user with his local N11 service, and receive the same N11 code from a second user in a second location and resolve the same N11 code to the appropriate alternate number to connect the second user with her local N11 service.

Embodiments of the disclosure may include the relay service 106 providing support for N11 codes selected from the group consisting of 211, 311, 511, 711 and 811. This is because 011 and 111 numbers have been assigned specific functions that are unrelated to the disclosure. For example, 011 is used as an exit code for dialing outside of the North American Numbering Plan to a foreign country, and 111 is not used because it starts with a 1 so as not to interfere with long distance dialing numbers requiring a 1 prior to the area code. In addition, 411 calls typically provide more generic directory assistance rather than requiring local service for the caller. Thus, 411 call services typically ask the caller to identify the requested location, rather than assuming the political boundaries (e.g., city, state, county, etc.) of the caller. As another example, 411 calls may be serviced based on the area code of the caller by appending a specific number (e.g., 555-1212) to the caller's area code. For example, a customer with a phone number of (801) 999-9999 calling 411 would be translated into calling (801) 555-1212.

In addition, the 611 code has been allocated for use by the services providers to provide customer service to its customers. For example, if the customer of the VRS provider initiates a call by dialing 611, the call is simply routed to a customer service representative of the VRS provider. Customers of other service providers (e.g., Verizon, Sprint, etc.) would also be similarly routed to a customer service representative of that service provider. In some embodiments, resolving the 611 to dial the customer service of the VRS provider may be performed by the video communication device 102 rather than the relay service 106.

Also, as discussed above, 911 calls in the VRS industry are currently sent to a third party provider to handle the emergency calls. Thus, some embodiments may handle 911 calls differently from the other N11 calls by routing the calls to the third party provider to resolve and connect to the emergency services. In some embodiments, however, the relay service 106 may be configured to handle its own 911 calls in a manner similar to the other N11 calls described below.

Of course, if the 011 code, the 111 code, 411 code, 611 code, and/or 911 code were assigned a different functionality, it is contemplated that embodiments of the disclosure include the modifications to accommodate the assigned functionality.

The relay service 106 may include a customer database 108, an N11 database 110, and other databases storing information from which the relay service 106 may query to authenticate registered users, establish communication sessions, route communication sessions, etc., as will be discussed in more detail below. For example, the customer database 108 may include customer records including the name, address (e.g., street address, city, state, zip code, etc.), and other information for establishing the user as a valid customer of the relay service 106 for participating in assisted calls. The N11 database 110 may include the various alternate numbers for different N11 codes across the various defined regions to retrieve when connecting a user to his appropriate N11 service responsive to receiving an incoming call using an N11 code. In some embodiments, the relay service 106 may include an additional address database that includes linked entries for cities, states, counties, zip codes, etc., for various locations supported by the relay service 106. This information may be used to correlate customer records from the customer database 108 to an appropriate region (e.g., county) if such information is not present already in the customer database 108 while determining the appropriate N11 service for the particular customer. In some embodiments, such an address database may be built into the customer database 108 and/or the N11 database 110. In some embodiments, such an address database may be a separate database that may be provided by a third party entity (e.g., the United States Postal Service).

It should be understood that the video communication device 102, the far-end communication device 104, the relay service 106, and N11 services 112 may be configured to transmit the data signals 103, 105, 107 over one or more networks. The networks used for conveying the data signals 103, 105, 107 may include an internet protocol (IP) network. The networks may also include other networks, such as, for example, public switched telephone networks (PSTNs). The networks may include a wide area network (WAN), a local area network (LAN), a personal area network (PAN), and combinations thereof. In some embodiments, the networks may include a cloud network. The networks may be configured to facilitate wireless communications, communications through cables, and combinations thereof. Some non-limiting examples of suitable wireless communications may include "Wi-Fi" and mobile wireless networks. Some non-limiting examples of suitable cables include fiber-optic cables, coaxial cables, traditional telephone cables, and Ethernet cables.

Figure 2:
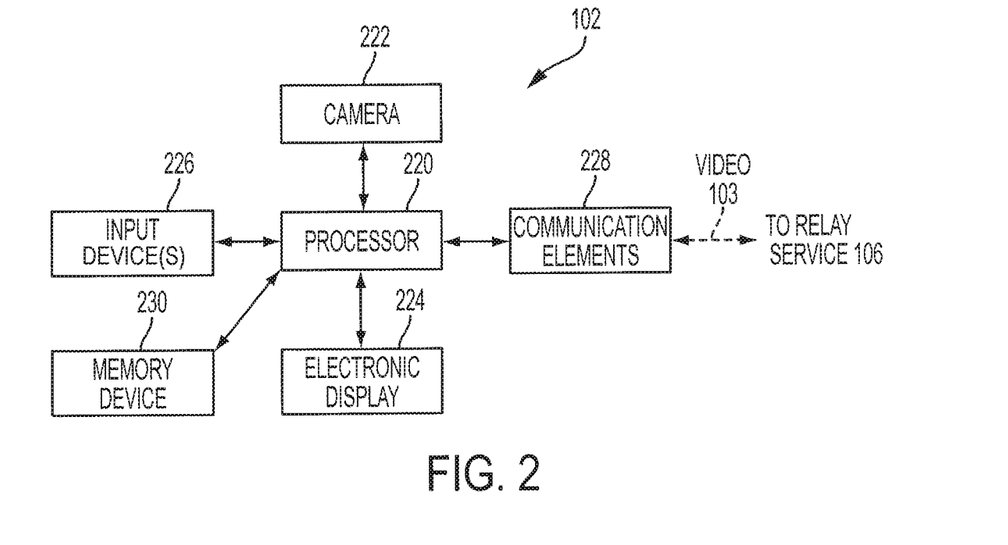
FIG. 2 is a simplified block diagram of the video communication device of FIG. 1.

FIG. 2 is a simplified block diagram of the video communication device 102 of FIG. 1. The video communication device 102 may include a processor 220 operably coupled with a camera 222, an electronic display 224, input devices 226, one or more communication elements 228, and a memory device 230. The video communication device 102 may be configured to communicate video data 103 from the camera 222 to the relay service 106 (FIG. 1) through the communication elements 228. The video data 103 captured by the camera 222 may include sign language communication originated by the near-end user. The video communication device 102 may also be configured to receive video data 103 from the relay service 106 through the communication elements 228 to be displayed by the electronic display 224. The video data 103 received by the video communication device 102 may include sign language communication originated by the call assistant at the relay service 106.

The processor 220 may coordinate the communication between the various devices as well as execute instructions stored in computer-readable media of the memory device 230. The memory device 230 may include volatile and non-volatile memory storage for the video communication device 102. The processor 220 may include one or more processors. For example, the processor 220 may include a video processor and an audio processor.

Input devices 226 may include devices such as a keyboard, touch screen interface, remote control, microphone, infrared camera, motion sensors, or other devices that are configured to receive information that may be used by the processor 220 to receive inputs that are used by the processor 220 to determine the signing area and/or operate different functions of the video communication device 102.

In some embodiments, the camera 222 may be integrated into the video communication device 102. The camera 222 may be a camera 222 integrated into a video phone. For example, the camera 222 may be similar to the cameras described in U.S. Pat. No. 8,976,220 to Maxwell, issued Mar. 10, 2015, the disclosure of which is incorporated herein in its entirety by this reference. In other embodiments, the camera 222 may be separate from the video communication device 102 but may be operably coupled to the video communication device 102. For example, the camera 222 may be mounted to a display (e.g., a television) such that the display may serve as electronic display 224 of the video communication device 102. The camera 222 may be similar to the camera described in U.S. patent application Ser. No. 14/630,452 to Winsor et al., filed Feb. 24, 2015, or the Remote Camera Unit described in U.S. patent application Ser. No. 14/741,296 to Winsor et al., filed Jun. 16, 2015, the disclosure of each which are incorporated herein in their entireties by this reference. In other embodiments, the camera 222 may include an image capturing device of one or more of a computer, laptop, phone, tablet, mobile device, PDA, etc. Furthermore, the camera 222 could be any image capturing device that can be used in conjunction with video communication.

Figure 3A:
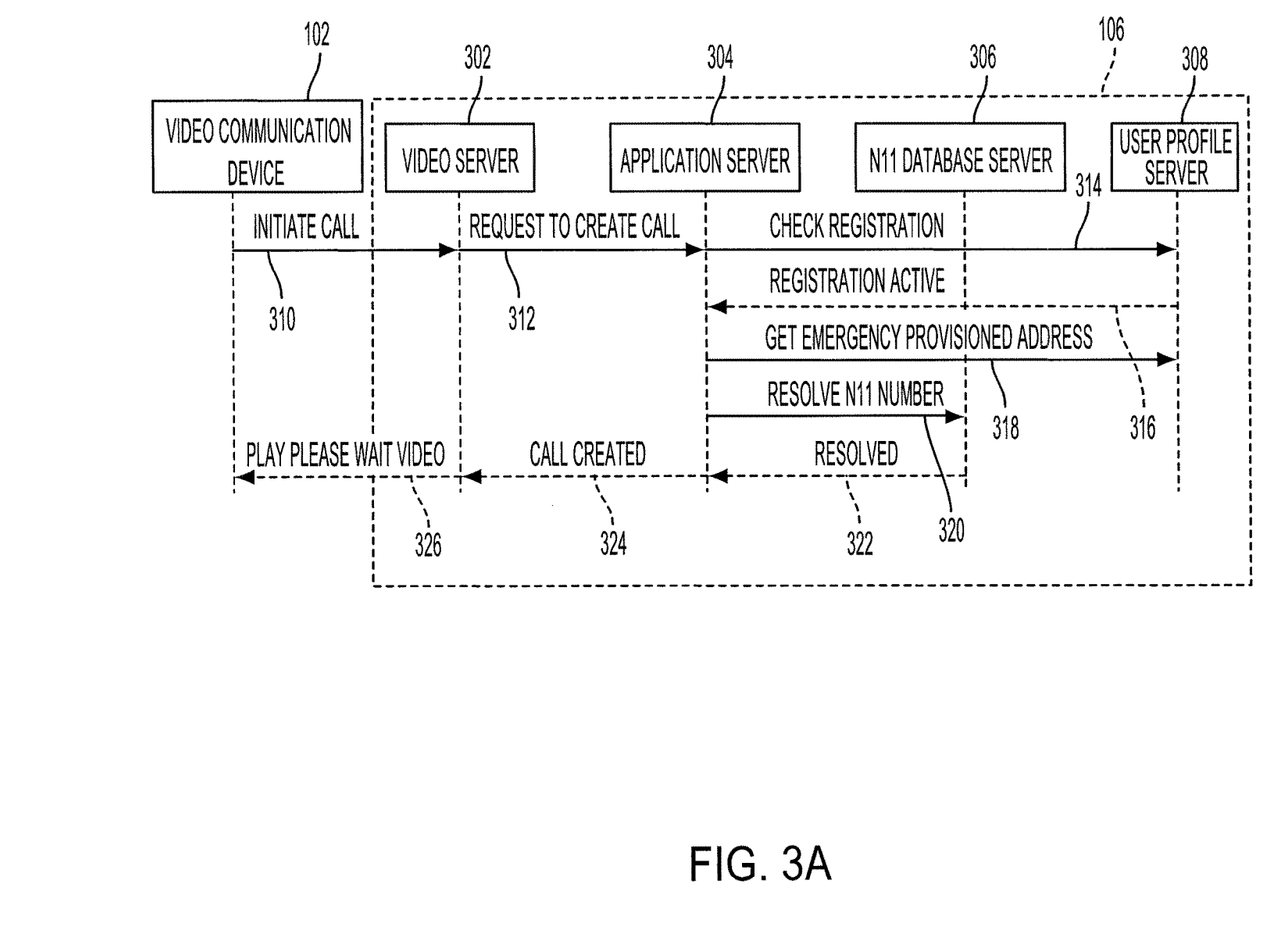
FIGS. 3A-3C are schematic diagrams illustrating different call flows for the communication system of FIG. 1 according to embodiments of the disclosure.
Figure 3B:
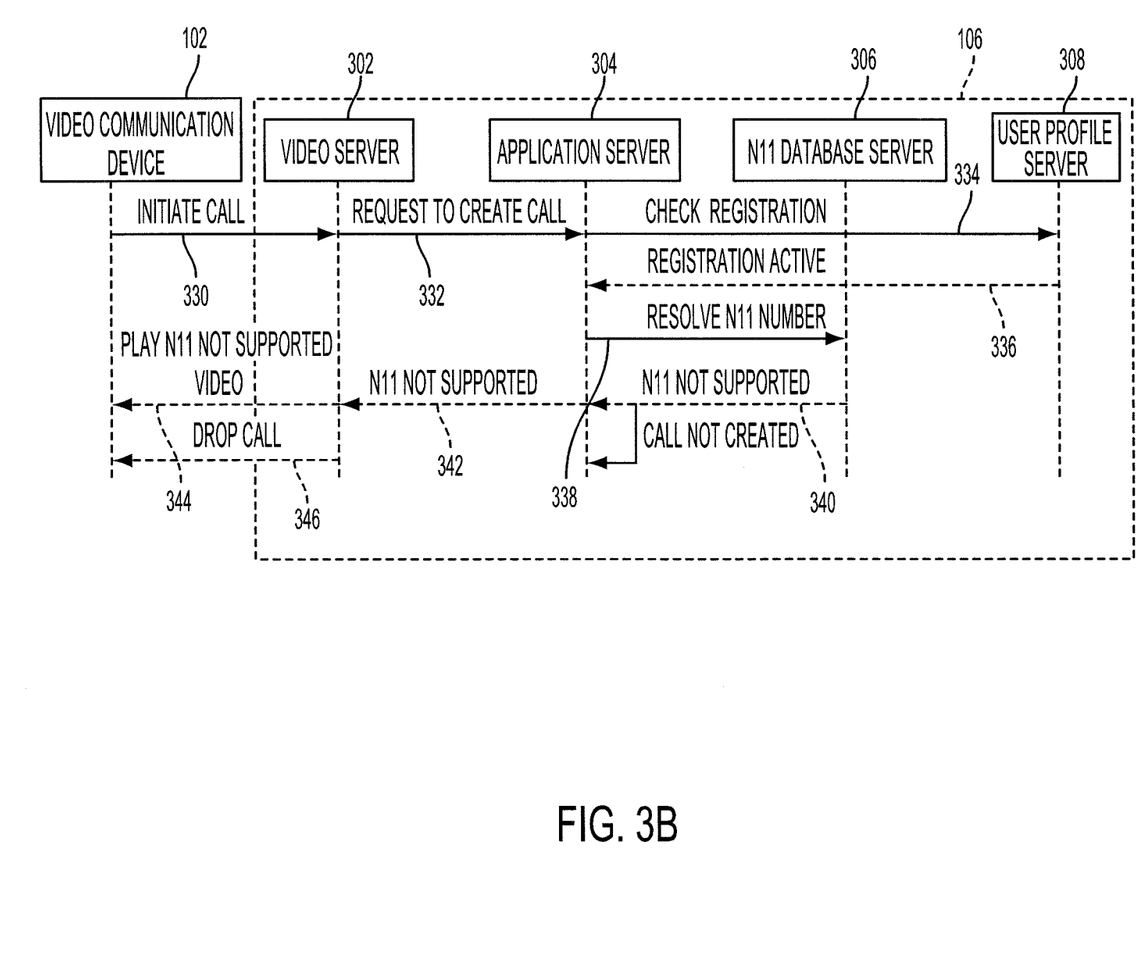
Figure 3C:
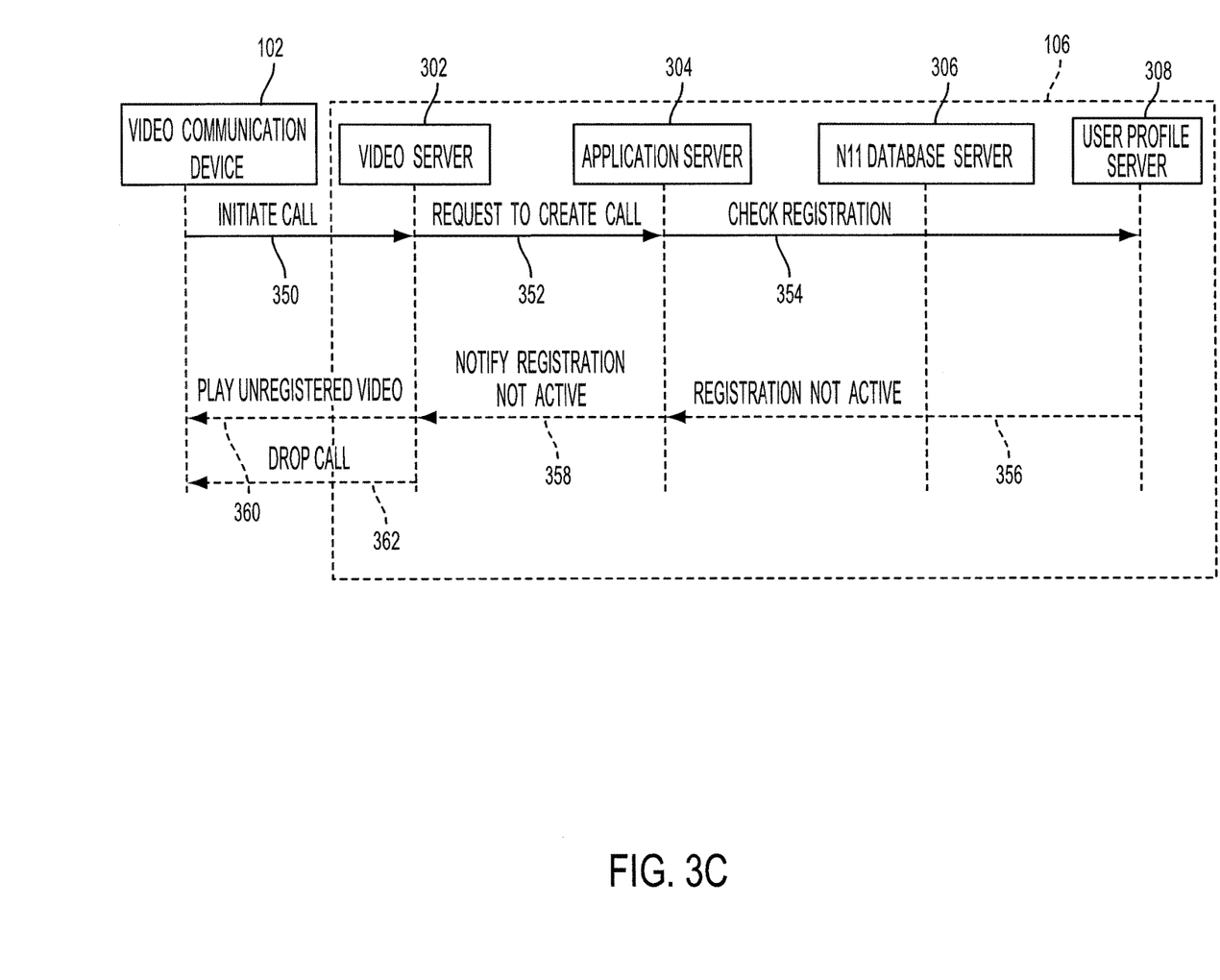

FIGS. 3A-3C are schematic diagrams illustrating different call flows for the communication system 100 (FIG. 1) according to embodiments of the disclosure. In particular, the calls may be between the video communication device 102 and the relay service 106 (e.g., VRS). The relay service 106 may include a video server 302, an application server 304, an N11 database server 306, and a user profile server 308. The video server 302 may be configured to receive incoming calls and initiate call requests with the application server 304, and to place the incoming calls in a queue to await the next available call assistant. Thus, the video server 302 may be configured as a hold server in some embodiments. The application server 304 may be configured to create calls (i.e., establish communication sessions) between the video communication device 102 and the far-end communication device 104 (FIG. 1) as well as the call assistant to provide the sign language translation during the communication session. The N11 database server 306 may be configured to resolve N11 codes when an N11 call is received by converting the received N11 code to the appropriate alternate number (e.g., corresponding 10 digit number) for the appropriate N11 service for the video communication device 102. The user profile server 308 may be configured to handle verification of user registration for using the video relay service.

As discussed above, for some embodiments the N11 code is selected from the group consisting of 211, 311, 511, 711 and 811. As discussed above, other N11 codes (e.g., 011, 111, 411, 611, and/or 911) may be handled differently because of their unique functionality. In some embodiments, 911 calls may be handled similar to the group of 211, 311, 511, 711, and 811 calls within the relay service 106 rather than being sent to a third party to handle. Other N11 codes may also be handled similar to the group if the functionality thereof is redefined.

Referring specifically to FIG. 3A, this call flow represents a situation in which the caller (i.e., using the video communication device 102) is a registered user of the communication system 100 (FIG. 1) and initiates a call using an N11 code that is supported by the communication system 100. As a registered user, the caller may be certified as an audibly-impaired user that is a valid user of the video relay service.

At operation 310, the video communication device 102 initiates a call responsive to an input from the audibly-impaired user. The call may be is received by the relay service 106 (e.g., by the video server 302). The relay service 106 may handle incoming calls using identifiers for various different endpoint; however, for purposes of this example the call may include an N11 code. The call request may be initially received by the video server 302 of the relay service 106 until the next available call assistant (e.g., sign language interpreter) is ready to participate in the communication session.

At operation 312, the video server 302 may send a request to the application server 304 to create the call according to the N11 code entered by the audibly-impaired user. As a result, a call record may be created. At operation 314, a registration check may be performed by the relay service 106 prior to the N11 code resolution. The application server 304 may check the registration status of the caller by querying the customer database that may be stored and managed by the user profile server 308. At operation 316, the user profile server 308 may return a status report to the application server 304 that the caller's registration with the relay service 106 is active.

At operation 318, the caller's address information may be retrieved by the relay service 106. In particular, the caller's address may be retrieved from the customer database of the user profile server 308. In some embodiments, the address information for the caller may be the emergency address provided by the caller during initial registration as a customer of the relay service 106. The address may be used to determine the alternate number to use while resolving the N11 code to connect to the appropriate N11 service for the caller.

At operation 320, the relay service 106 may resolve the N11 code to the appropriate alternate number based, at least in part, on the address information of the calling party. The application server 304 may resolve the N11 code by querying the N11 database server 306 to determine the appropriate alternate number for the N11 code supported by the relay service 106. The query may include the N11 code used for the call as well as address information (e.g., city, state, zip code, etc.) for the N11 database server 306 to use to determine the appropriate alternate number. In some embodiments, the query may also include a transaction ID that may be used for logging messages to aid in the tracing of transaction events in the log entries.

In some embodiments, resolving the N11 code to the alternate number may be accomplished by using one or more different filters on the data records to arrive at a single alternate number. The filters on the data may return data records based on the customer's city, state, county, and combinations thereof as will be discussed further below with respect to FIGS. 4 through 7. In some embodiments, if multiple records remain after application of the different data filters, the first record from the list returned by the query may be used as the matching record to use as the alternate number. A log may be created indicating that the search resulted in multiple alternate numbers so that technicians can investigate if the alternate numbers and/or filters need updating.

At operation 322, the N11 database server 306 may return an N11 status result indicating whether the N11 code has been resolved. The status result may include the status (e.g., resolved, not supported, error, etc.) as well as a data string with the alternate phone number for the N11 code resulting from the query. If the returned N11 status result is set to "resolved," then the calling number may be updated using the phone number returned by the N11 database server 306 as the alternate number. At operation 324, the call creation process may continue with the application server 304 informing the video server 302 that the call is created. At operation 326, the video server 302 may send a notification to the video communication device 102 that the call has been created and to play a video to inform the audibly-impaired user to please wait until the next available call assistant is ready. In some embodiments, the video may be selected and streamed by the video server 302.

Referring specifically to FIG. 3B, this call flow represents a situation in which the caller (i.e., using the video communication device 102) is a registered user of the communication system 100 (FIG. 1), but initiates a call using an N11 code that is not supported by the communication system 100.

At operations 330 through 338, the call flow operates similar to operations 310 through 320 of FIG. 3A. The relay service 106 may determine, however, that the N11 code called by the customer is not supported for the customer's particular location. This may be determined after an N11 code search has been attempted without finding a matching record in the N11 database. This lack of support by the relay service 106 may be the result of a particular N11 service not existing for that particular location. In some situations, the lack of support may be the result of the relay service 106 not having the N11 service's information stored in its N11 database. In either event, operation 340 provides that the N11 database server 306 indicates to the application server 304 that the N11 code is not supported. As a result, the application server 304 does not create the call with any N11 service or call assistant. At operation 342, the application server 304 may indicate to the video server 302 that the N11 code is not supported. At operation 344, the video server 302 may send a notification to the video communication device 102 that the call has not been created and to play a video to inform the audibly-impaired user that the N11 service is not supported by the relay service 106 at this time. In some embodiments, the video may be selected and streamed by the video server 302. At operation 346, the call between the relay service 106 and the video communication device 102 may be dropped. As a result, the connection between the video communication device 102 and the video server 302 may be dropped without a connection being made with the call assistant. In some embodiments, the connection between the audibly-impaired user and the call assistant at this stage may be established when the audibly-impaired user is informed that the N11 service is not supported by the relay service. In such an embodiment, the call assistant may ask if another number is desired, at which point either the audibly-impaired user or the call assistant may enter the new number (e.g., using a different N11 code, a 10 digit number, etc.) to place a new call to establish a second connection to a far-end communication device. The new call may be to a different N11 service or to any far-end user as desired by the audibly-impaired user.

In some embodiments, the relay service 106 may automatically generate a report (e.g., message) to its technical support team to inform them that a call was placed to an N11 code that is not supported by the relay service 106 at this time. The report may include the N11 code dialed, the customer's location (e.g., city, state, county, zip code, etc.), and other relevant information about the call. The technical support team may then follow up to see if they can find an alternate number for that N11 code for that location. If such an alternate number is identified, the N11 database may be updated to include the new alternate number. In addition, the technical support team may inform the customer that the N11 service is now supported by the relay service 106 for future use. In some embodiments, other customers that have the same location information may also be sent a message informing them that a new N11 service is available to them.

Referring specifically to FIG. 3C, this call flow represents a situation in which the caller (i.e., using the video communication device 102) is a registered user of the communication system 100 (FIG. 1) and initiates a call using an N11 code that is supported by the communication system 100. As a registered user, the caller may be certified as an audibly-impaired user that is a valid user of the video relay service.

At operations 350 through 354, the call flow operates similar to operations 310 through 314 of FIG. 3A to check the registration status of the caller. The relay service 106 may determine, however, that the caller does not currently have a valid registration with the relay service 106. As a result, at operation 356 the user profile server 308 may indicate to the application server 304 that the customer's registration is not active. At operation 358, the application server 304 may notify the video server 302 that the registration is not active. At operation 360, the video server 302 may send a notification to the video communication device 102 that the call has not been created and to play a video to inform the audibly-impaired user that the customer is currently not a registered user of the relay service 106 at this time. In some embodiments, the video may be selected and streamed by the video server 302. At operation 362, the call between the relay service 106 and the video communication device 102 may be dropped. As a result, the connection between the video communication device 102 and the video server 302 may be dropped without a connection being made with the call assistant.

FIGS. 4 through 7 are flowcharts illustrating various methods of operating the relay service to enable handling of N11 calls by the video communication devices of the network. Each N11 code may be resolved to the appropriate alternate number by applying one or more filters to query to the N11 database. In some embodiments, a primary filter may be applied to return a first set of results, followed by one or more secondary (i.e., subsequent) filters to narrow the first set of results to a single alternate number to return to the application server 304 (FIGS. 3A-3C) to use for establishing the second connection to the appropriate N11 service (the first connection being between the relay service 106 and the video communication device 102). As an example, a first filter may be applied based on the caller's state, a second filter may be applied based on the caller's county, and a third filter may be based on the caller's city. Of course, different orders for the filter may be defined. In some embodiments, each N11 code may be resolved to the appropriate alternate number differently depending on the different filters applied by the query. For example, a first N11 code (e.g., 211) may have its filters defined differently than a second N11 code (e.g., 311). In other words, the rules for arriving at the alternate number to use may be different among the different N11 codes.

As an example, Table 2 provides a list of contemplated priorities for different search filters that may be applied:

TABLE 2

PRIORITY RULES

| N11 Code | State Search Filter Priority | County Search Filter Priority | City Search Filter Priority | Zip Code Search Filter Priority |
|---|---|---|---|---|
| 211 | 1 | 2 | Null | Null |
| 311 | 0 | Null | 1 | Null |
| 511 | 1 | 2 | Null | Null |
| 711 | 1 | 2 | Null | Null |
| 811 | 1 | 2 | Null | Null |

In Table 2, a priority of "0" means the column may be included within the search criteria, but the column will never be used as the sole search limit. A priority of "1" means that the column may be included within the first search performed to locate the N11 code and phone number. If that search fails to return any results, the search may end. A priority of "2" means that the column may be the next column to use to limit data if more than one row is returned by the priority 1 search. If there are no results from the priority 2 search, but the primary search results (i.e., from the priority 1 search) returned more than one result, one of the primary search results may be used by default (e.g., the first result from the list). A priority of "Null" means that column may not be used in the search criteria. Additional priorities may be defined in other embodiments, such as a priority of "3" or greater may be reserved for future use.

Figure 4:
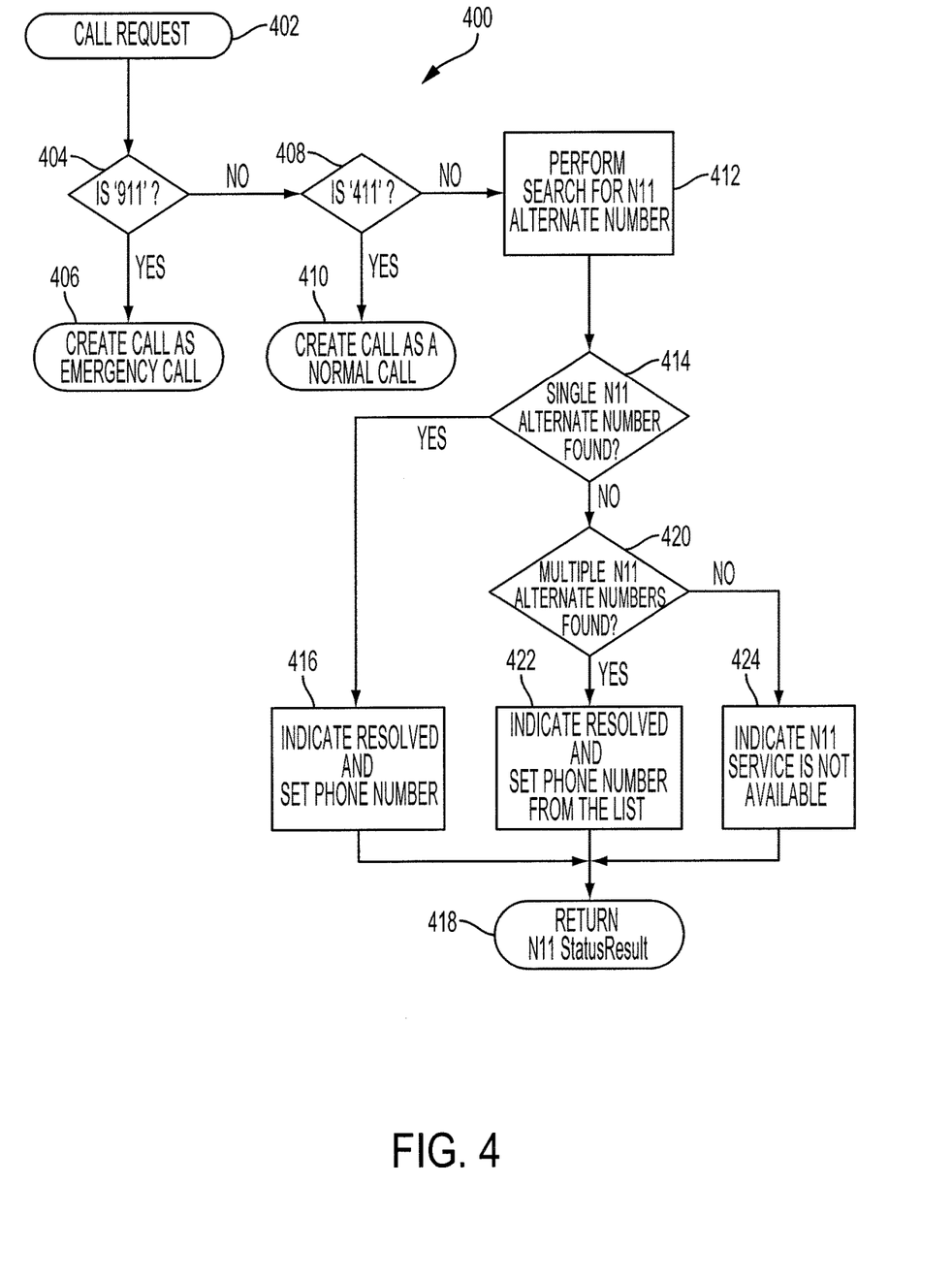
FIGS. 4 through 7 are flowcharts illustrating various methods of operating the relay service to enable handling of N11 calls by the video communication devices of the network.

Referring specifically to FIG. 4, flowchart 400 is a method of operating a relay service receiving an N11 call from a video communication device. At operation 402, the call may be initially received by the video server that then initiates the call request to the application server. In some embodiments, a video server may not be used and the call request may be received directly by the application server. At operation 404, it may be determined if the N11 code is "911." If so, then the emergency call may be created by the application server at operation 406. As discussed above, relay services typically have used third parties to create to establish the emergency call to the appropriate emergency operator. At operation 408, it may be determined if the N11 code is "411". If so, then the call may be created as a normal call to the alternate number assigned for 411 calls at operation 410.

If the N11 code is neither "911" nor "411," then the relay service may at operation 412 perform a search for the appropriate alternate number corresponding to the dialed N11 code and the political boundaries for the customer. For example, the relay service may query an N11 database to arrive at the appropriate alternate number to use to create the second connection between the relay service and the N11 service. The search may be performed according to the rules set for applying one or more filters for the particular N11 code being called. At operation 414, it may be determined if the query results in a single N11 alternate number. If so, the single number may be indicated at operation 416 as the resolved phone number to be used to create the call. At operation 420, it may be determined if multiple N11 alternate numbers result from the search. If so, then one of the alternate numbers from the list (e.g., the first entry) may be selected as the resolved phone number at operation 422 to be used as the alternate number to create the call. If no alternate numbers result from the search, the status may indicate at operation 424 that no N11 service is supported by the relay service for that particular N11 code in the particular political boundary of the customer. At operation 418, the relay service may return the N11 status result such that the application server and/or video server may perform the appropriate action responsive to the search result to either create the call, terminate the call, inform the customer of the result, etc.

Figure 5:
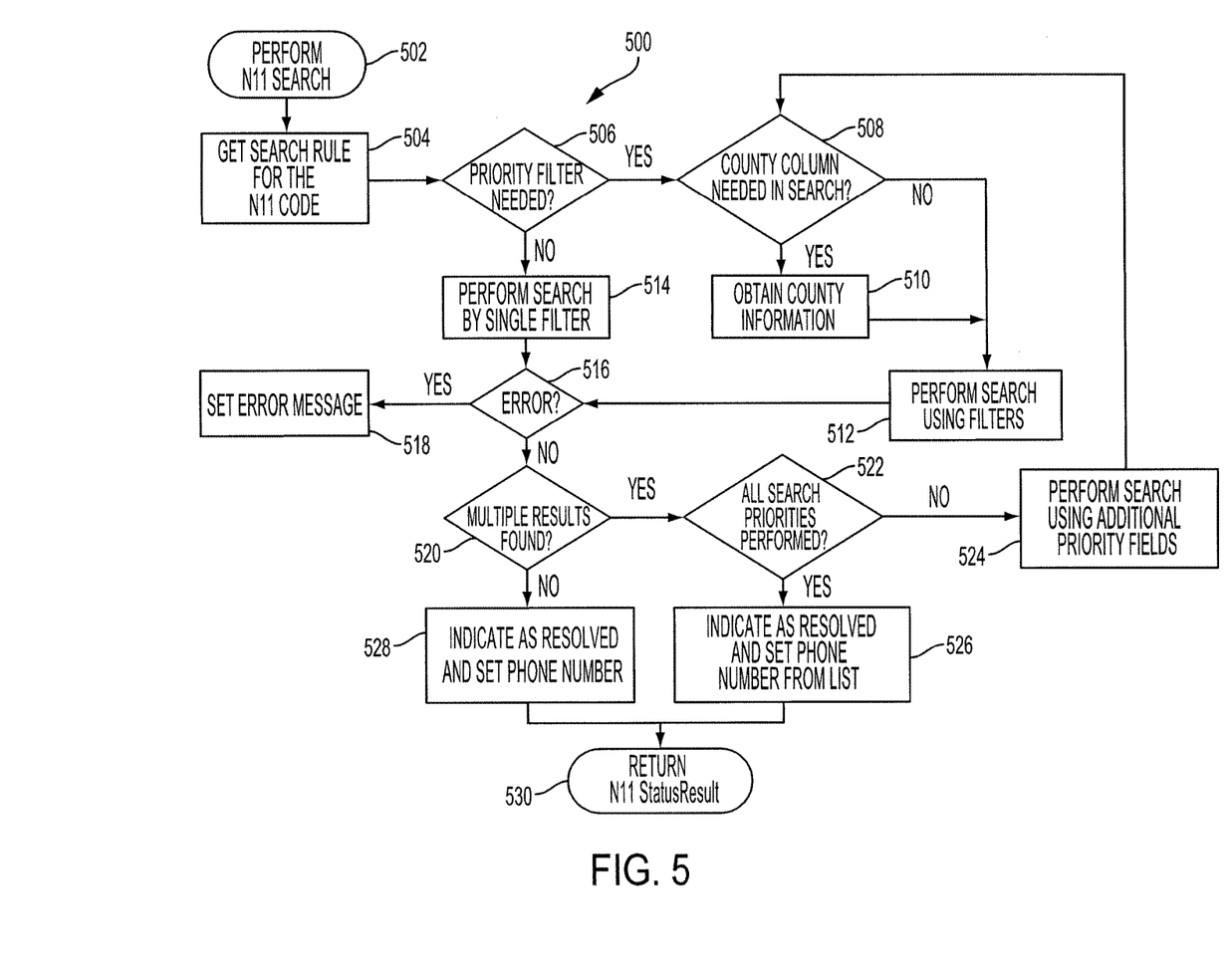

Referring specifically to FIG. 5, flowchart 500 is a method of performing the search to retrieve the appropriate alternate number for the N11 code. At operation 502, the N11 search may be initiated at the relay service responsive to the N11 code dialed by the user. At operation 504, the predetermined search rule for the specific N11 code may be retrieved from the N11 search rule table (e.g., Table 2 above). As discussed above, the search rules may set different priority filters depending on which N11 code was dialed. At operation 506, it may be determined if a priority filter is needed. If so, then the method may continue at operation 508 to determine if the rules require county information to be used in the search. If county information is needed for the search, the customer's county information may be retrieved at operation 510 from postal information stored in a separate database or in the customer database. In some embodiments, the county information may be derived using the customer's zip code or other address information stored in the customer database. The method may continue at operation 512 to perform the search using different filter fields such as by city, state, county, etc., according to the priorities given. If no priority filters are needed, then a single filter-operation 514 (e.g., state search) may be applied for the search. At operation 516, any errors from the search results may be identified. At operation 518, it may be indicated that an error occurred and an error message may be set. For example, no results may have been found indicating that the N11 service desired by the customer is not available and/or is not currently supported by the relay service.

At operation 520, it may be determined if the search results have returned multiple rows (i.e., results). If not, then the N11 code may be resolved to the alternate number, which may be set as the phone number to use to create the call. If multiple results are found, then it may be determined at operation 522 whether all search priorities have been applied. If no, then the method may continue with the search at operation 524 to apply the additional remaining fields for the next priority. If multiple results remain after all priority filters have been applied, then the method may select one of the results (e.g., the first result on the list) to use as the alternate number at operation 526. At operation 530, the relay service may return the N11 status result such that the application server and/or video server may perform the appropriate action responsive to the search result to either create the call, terminate the call, inform the customer of the result, etc.

Figure 6:
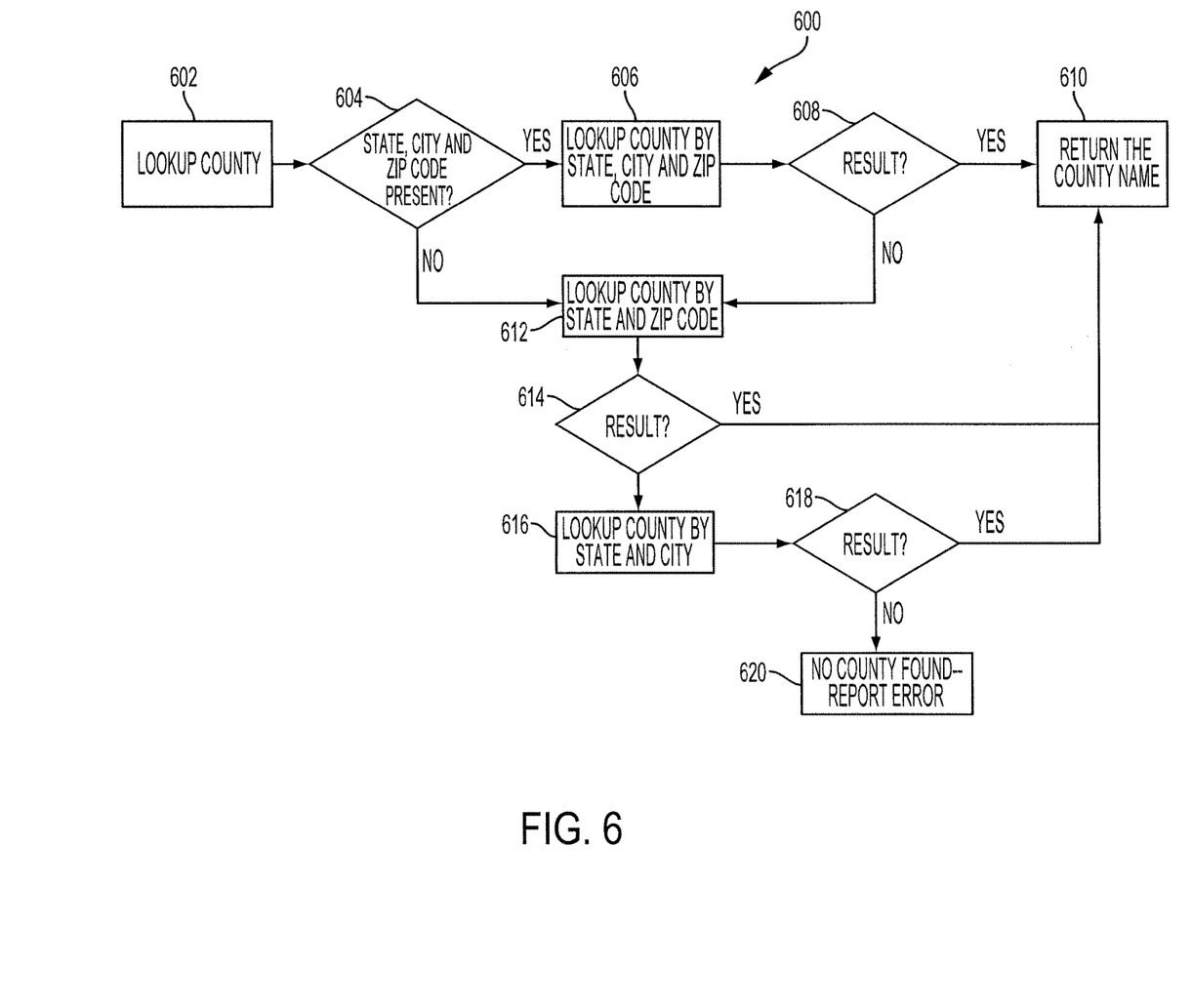

Referring specifically to FIG. 6, flowchart 600 is a method of performing the search. In particular, the method includes retrieving the county information if the county is required by the priority filters when resolving the N11 code to its appropriate alternate number. As discussed above, the county information may be stored in a separate database (e.g., populated by post office data) from the customer database having the customer's street address. At operation 602, the county lookup process may begin. At operation 604, it may be determined if the relay service has each of the state, city, and zip code in the customer record in the customer database. If so, at operation 606 the county database may be queried using the state, city, and zip code for the customer. At operation 608, if a result exists, then the county name may be returned at operation 610. If no result exists, then the county database may be queried at operation 612 using the state and zip code (without the city) for the customer. At operation 614, if a result exists, then the county name may be returned at operation 610. If no result exists, then the county database may be queried at operation 616 using the state and city (without the zip code) for the customer. At operation 618, if a result exists, then the county name may be returned at operation 610. If no result exists, then at operation 620 an error may be reported indicating that no county information was found.

Figure 7:
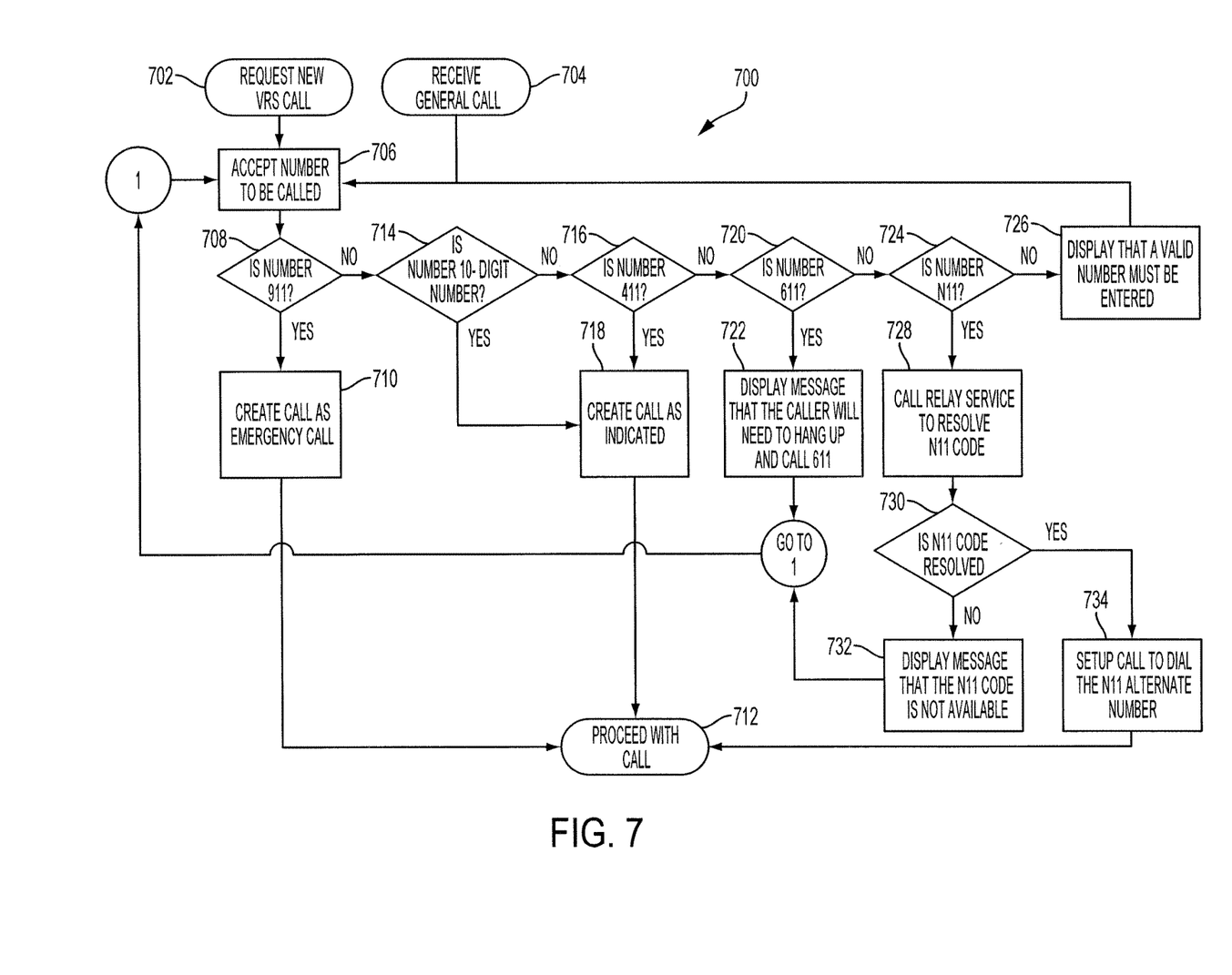

Referring specifically to FIG. 7, flowchart 700 is a method of handling and creating a call received by an application stored on the call assistant station at the video relay service when the caller has not dialed an N11 number according to an embodiment of the disclosure. At operation 702 or operation 704, a call may be received at the call assistant station of the relay service. For example, at operation 702, the call assistant station may receive a new call, such as a call waiting in queue with the video server acting as a hold server. At operation 704, the call assistant station may receive a general call (e.g., a call that arrives without including a specific number to be dialed). In either case, the call may be handled by the call assistant station without having a need to resolve the N11 code to the alternate number. In some embodiments, the phone number may be entered by the call assistant while already connected with the audibly-impaired user's video communication device.

At operation 706, the call may be received and the phone number accepted by the call assistant station. The call assistant station may evaluate the dialed phone number to determine how to proceed with the call at operation 712. For example, at operation 708, it may be determined if the phone number received is the 911 code. If so, the call assistant station may create the call as an emergency call at operation 710. At operation 714, it may be determined if the phone number is a 10-digit number (or an 11-digit number with a leading 1 prior to the 10-digit number in some embodiments). If so, the call assistant station may create the call as indicated using the 10-digit number at operation 718. At operation 716, it may be determined if the phone number is the 411 code. If so, the call assistant station may create the call as indicated at operation 718 using the predetermined number for directory assistance as discussed above.

At operation 720, it may be determined if the phone number is the 611 code. If so, the call assistant station may cause a message to be displayed at operation 722 for the caller to hang up and call 611 themselves in order to be directed to the customer support for the VRS service without the assistance of a separate call assistant. In some embodiments, the call assistant station may assist with connecting the audibly-impaired user to the 611 customer service without needing to hang up. Once connected with the 611 customer service, the call assistant may leave the call.

At operation 724, it may be determined if the dialed number is one of the remaining N11 codes. If so, the relay service may be called at operation 728 to resolve the N11 code to its appropriate alternate number as discussed above. At operation 730, it may be determined if the N11 code has been resolved to its appropriate alternate number. If so, then the call may be set up to establish the second connection between the relay service and the N11 service using the N11 alternate number at operation 734. If the N11 code was not able to be resolved, then at operation 732 a message may be displayed to the video communication device that the dialed N11 code is not available or supported by the relay service at this time.

In the various embodiments discussed above, the query may be initiated based on the address provided in the customer database to determine the political boundary for determining the appropriate alternate number to use for the call. In some embodiments, the physical location of the video communication device may be used to determine the appropriate N11 service for that location. In such an embodiment, the video communication device may provide its geolocation (e.g., GPS coordinates) to the relay service when placing the call. The relay service may have a map that is used to convert the geolocation to a coordinate on the map to determine its location in terms of the political boundary (e.g., city, state, county, zip code) that define the N11 service to be used. The relay service may maintain a different map for each different N11 code as the boundaries for the various N11 services may be different. For example, there may be a 211 map, a 311 map, and so on. In some embodiments, political boundaries may be identified from the caller's phone number (e.g., area code or other phone number prefix). For example, phone numbers that begin with (801) 299-XXXX may be known to be assigned to individuals in specific city (e.g., Bountiful, Utah).

In addition, the various embodiments discussed above describe resolving the N11 code to the appropriate alternate number at the relay service. In some embodiments, the video communication device may be configured to determine the appropriate alternate number for the N11 service when the call is dialed. Thus, the call is sent to the relay service with the alternate number already having been determined by the video communication device. As a result, the relay service may simply establish the second connection to the N11 service when a call assistant becomes available. In such an embodiment, at least a portion of the rules, N11 database, etc., may be stored in memory of the video communication device. In some embodiments, the relay service may be configured to send the alternate numbers to each video communication device within its network. As a result, the video communication device may have a 211 alternate number, a 311 alternate number, etc., stored therein. As an example, when the customer account is created, the relay service may run a query for each N11 service for the customer's location and then send the alternate numbers for each N11 code for local storage by the video communication device. As changes are made to the remote database to include additional N11 services and/or update alternate numbers, the relay service may send updates to the video communication devices that are affected by the change. In addition, if the address of the customer changes, the relay service may automatically send updated alternate numbers for each N11 code responsive to the address change.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video relay service comprising:
   at least one server configured to:
   manage a customer database including customer records for audibly-impaired users of the video relay service;
   manage an N11 database including alternate numbers corresponding to N11 codes for a plurality of different locations defined by political boundaries;
   receive incoming video calls including an N11 code from a calling party, the N11 code selected from the group consisting of 211, 311, 511, 711, and 811;
   resolve the N11 code to an appropriate alternate number for an N11 service based on a political boundary for the calling party responsive to a query of the N11 database;
   establish a first connection between a video communication device associated with the calling party and a call assistant station associated with a sign language interpreter; and
   establish a second connection between the call assistant station and the N11 service, wherein the at least one server is configured to resolve the N11 code to the appropriate alternate number by applying one or more priority filters during a search of the N11 database.

2. The video relay service of claim 1, wherein the at least one server includes:
   a video server configured to initially receive the incoming video call; and
   an application server configured to receive a call request from the video server and query the N11 database to initiate resolving the N11 code to an appropriate alternate number.

3. The video relay service of claim 2, wherein the at least one server further includes an N11 database server that stores the N11 database.

4. The video relay service of claim 3, wherein the at least one server further includes a profile server that stores the customer database.

5. The video relay service of claim 1, wherein two or more of the N11 codes have different rules that define the order of a priority of the one or more priority filters applied.

6. The video relay service of claim 5, wherein the one or more priority filters include at least one of a state filter, a city filter, a county filter, or a zip code filter.

7. The video relay service of claim 6, wherein the county filter applies county information retrieved from a separate county database.

8. The video relay service of claim 7, wherein the county database is populated with post office data that is correlated with information from the customer database.

9. A video relay service comprising:
   at least one server configured to:
   manage a customer database including customer records for audibly-impaired users of the video relay service;
   manage an N11 database including alternate numbers corresponding to N11 codes for a plurality of different locations defined by political boundaries;
   receive incoming video calls including an N11 code from a calling party, the N11 code selected from the group consisting of 211, 311, 511, 711, and 811;
   resolve the N11 code to an appropriate alternate number for an N11 service based on a political boundary for the calling party responsive to a query of the N11 database;
   establish a first connection between a video communication device associated with the calling party and a call assistant station associated with a sign language interpreter;
   establish a second connection between the call assistant station and the N11; and
   inform the video communication device that the N11 service is not supported by the video relay service responsive to no appropriate alternate calling numbers being retrieved.

10. The video relay service of claim 1, wherein the at least one server is configured to inform the video communication device that the N11 service is not supported by the video relay service by causing a video to play on the video communication device.

11. A method of routing an N11 call received at a video relay service configured to provide sign language interpretive services during the N11 call, the method comprising:
   receiving a call including an N11 code at a video relay service from a video communication device associated with a registered customer of the video relay service;
   establishing a first connection between the video relay service and the video communication device;
   resolving the N11 code to an alternate number corresponding to an appropriate N11 service based, at least in part, on the N11 code and a determination of at least one political boundary associated with a location of the video communication device, wherein the N11 code is selected from the group consisting of 211, 311, 511, 711, and 811;
   establishing a second connection between the video relay service and the appropriate N11 service responsive to resolving the N11 code to the alternate number such that a call assistant at the video relay service is connected to both the video communication device via the first connection and the N11 service via the second connection;
   retrieving a first set of filter priority rules corresponding to first N11 code while resolving the first N11 code during a first call; and
   retrieving a second set of filter priority rules corresponding to a second N11 code while resolving the second N11 code during a second call.

12. The method of claim 11, further comprising determining the at least one political boundary by querying at least one of a city, a state, a county, or a zip code corresponding to a customer record of the registered customer stored in a customer database.

13. The method of claim 12, further comprising using the at least one political boundary to query an N11 database including a plurality of alternate numbers for various political boundaries for the N11 code.

14. The method of claim 11, further comprising determining the at least one political boundary by receiving geolocational information from a user profile server during the call and comparing the geolocational information to a map having defined political boundaries for the N11 code.

15. The method of claim 11, wherein resolving the N11 code is performed by the video relay service.

16. A video communication system comprising:
a video communication device having a camera and a display screen configured for an audibly-impaired user to engage in a communication session with a far-end user; and
a video relay service configured to:
receive an N11 call from the video communication device responsive to an N11 code being dialed, wherein the N11 code is selected from the group consisting of 211, 311, 511, 711, and 811;
establish a first connection with the video communication device; and
establish a second connection with an N11 service corresponding to the N11 code and an appropriate alternate number resolved from the N11 code based on at least one political boundary designated for the video communication device, wherein the N11 code is resolved to the appropriate alternate number by applying one or more priority filters during a search of an N11 database including alternate numbers corresponding to N11 codes for a plurality of different locations defined by political boundaries.

17. The video communication system of claim 16, wherein the video communication device is configured to resolve the N11 code to the appropriate alternate number prior to sending the call request to the video relay service.

18. The video communication system of claim 16, wherein the video relay service is configured to resolve the N11 code to the appropriate alternate number responsive to receiving the call request with the N11 code from the video communication device.

19. The video relay service of claim 1, wherein the at least one server is further configured to manage an additional address database and correlate customer records from the customer database to a region identified by the additional address database.

20. The video relay service of claim 19, wherein the additional address database is a separate database having address information received by the relay service from a third party entity that is different from the relay service.

* * * * *